US012613312B2

(12) United States Patent
Holzinger et al.

(10) Patent No.: US 12,613,312 B2
(45) Date of Patent: Apr. 28, 2026

(54) SYSTEM AND METHOD FOR EMULATING MULTIPATH EFFECTS OF RADAR

(71) Applicant: Keysight Technologies, Inc., Santa Rosa, CA (US)

(72) Inventors: Bernhard Holzinger, Boeblingen (DE); Arvid Sims, Boeblingen (DE)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 201 days.

(21) Appl. No.: 18/425,853

(22) Filed: Jan. 29, 2024

(65) Prior Publication Data

US 2025/0244446 A1    Jul. 31, 2025

(51) Int. Cl.
*G01S 7/40* (2006.01)
*G01S 13/46* (2006.01)
*G01S 13/931* (2020.01)

(52) U.S. Cl.
CPC .......... *G01S 7/4091* (2021.05); *G01S 13/931* (2013.01); *G01S 2013/462* (2013.01)

(58) Field of Classification Search
CPC ................ G01S 13/006; G01S 13/931; G01S 2013/462; G01S 7/4052; G01S 7/4082; G01S 7/4091; G01S 7/4095
See application file for complete search history.

(56) References Cited

U.S. PATENT DOCUMENTS 7,161,529 B1 * 1/2007 Smith, Jr. ............... G01S 7/292
                                                              342/162
11,914,070 B2 * 2/2024 Hamberger ........... G01S 13/003

2017/0031003 A1 * 2/2017 Dougherty ............ G01S 7/4052
2021/0055383 A1 * 2/2021 Lee ........................ G01S 13/325
2021/0325508 A1 * 10/2021 Wang .................... G01S 7/2923
2021/0373122 A1 * 12/2021 Hamberger .......... G01S 7/4052

(Continued)

FOREIGN PATENT DOCUMENTS

CN       104459641 A      3/2015
CN       114781190 B      9/2022
KR       102596416 B1     10/2023

OTHER PUBLICATIONS

English translation of KR102596416B1, published Oct. 31, 2023, 20 pgs.

(Continued)

*Primary Examiner* — Peter M Bythrow

(57) ABSTRACT

A system emulates multipath effects of a radar signal transmitted by a radar and reflected from an emulated target and an emulated surface. The system includes RTSs configured to generate and transmit emulated echo signals having different phases in response to the radar signal, where a first RTS is configured to emulate the emulated target, receiving the radar signal via a direct path, and at least one second RTS is configured to emulate at least one ghost target corresponding to the emulated target; and a controller configured to control the RTSs to generate and transmit the emulated echo signals at the different phases, which correspond to the RTSs receiving the radar signal from the radar transmitter and the radar receiver receiving the emulated echo signals from the RTSs over different combinations of the direct the indirect paths to replicate interference effects caused by multipath propagation.

20 Claims, 8 Drawing Sheets

(56)                    References Cited

U.S. PATENT DOCUMENTS

| | | | | |
|---|---|---|---|---|
| 2022/0171022 A1* | 6/2022 | Bourde | ................. | G01S 7/4095 |
| 2023/0258770 A1* | 8/2023 | Ioffe | ..................... | G01S 13/931 |
| | | | | 342/169 |
| 2024/0111023 A1* | 4/2024 | Lee | ....................... | G01S 7/4086 |
| 2024/0201327 A1* | 6/2024 | Saalfeld | ............. | H04B 17/3911 |
| 2025/0102624 A1* | 3/2025 | Lee | ....................... | G01S 7/4086 |
| 2025/0231281 A1* | 7/2025 | Bogner | ................. | G01S 7/4052 |

OTHER PUBLICATIONS

English translation of CN104459641A, published Mar. 25, 2015, 6 pgs.
English translation of CN114781190B, published Sep. 2, 2022 14 pgs.
German Office Action dated Feb. 28, 2025, application No. 102025102819.2, with English translation, 4 pgs.

* cited by examiner

SYSTEM AND METHOD FOR EMULATING MULTIPATH EFFECTS OF RADAR

BACKGROUND

Advanced driver-assistance systems (ADASs) and autonomous driving systems for vehicles rely on detection and ranging systems that use detection and ranging electromagnetic signals, including millimeter wave radar signals, for example. The radar signals are used to warn of forward collisions and backward collisions, to implement adaptive cruise control and autonomous parking, for example, and ultimately to perform autonomous driving on streets and highways. Radars are promising due to low cost, and the ability to operate at night or in inclement weather conditions (e.g., fog, rain, snow, dust).

Conventional radar systems typically have multiple transmitters and receivers on the vehicle. Actual driving environments in which the radar systems may be deployed can vary greatly, and many such driving environments may be complex. For example, actual driving environments may contain numerous objects, some of which may have complicated reflection, diffraction and multi-time reflection characteristics that affect echo signals responsive to the radar signals. The immediate consequences of incorrectly sensing and/or interpreting echo signals may be that false warnings or improper reactions are triggered or warnings or reactions that should be triggered are not, which in turn can lead to collisions.

Emulation of targets for radar testing is desirable, since operating a vehicular radar in the actual driving environment may be dangerous, inefficient, expensive, and difficult to control. Generally, conventional radar target emulators attempt to emulate the physics of the problem. For example, a conventional radar target emulator may receive a radar signal transmitted from a radar under test, delay the radar signal by an amount corresponding to propagation delay resulting from range to the emulated target, scaling amplitude of the radar signal to account for the range and radar cross section (RCS) of the target, and then retransmit the scaled and delayed signal back to the radar under test, thereby emulating the transmission of the radar signal from the radar under test to the target and reflection of a corresponding echo signal.

The basic operation principle of a radar for detecting a target is to send out electromagnetic waves (radar signals) and to receive and analyze returned echo signals reflected from the target in response to the radar signals. In an ideal free-space environment, in which just the radar and the target exist, the radar signals would travel in a straight, direct path from the radar to the target and the echo signals would return to the radar following the same direct path. However, in the real world, especially in the context of automotive radars, some of the radar signals from the radar and the echo signals from the target may be reflected from surfaces of objects in the environment other than the target, thereby creating a number of indirect paths between the radar and the target in addition to the direct path. The radar and echo signals that travel along the potential indirect paths create extraneous "ghost targets" as seen by the radar.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
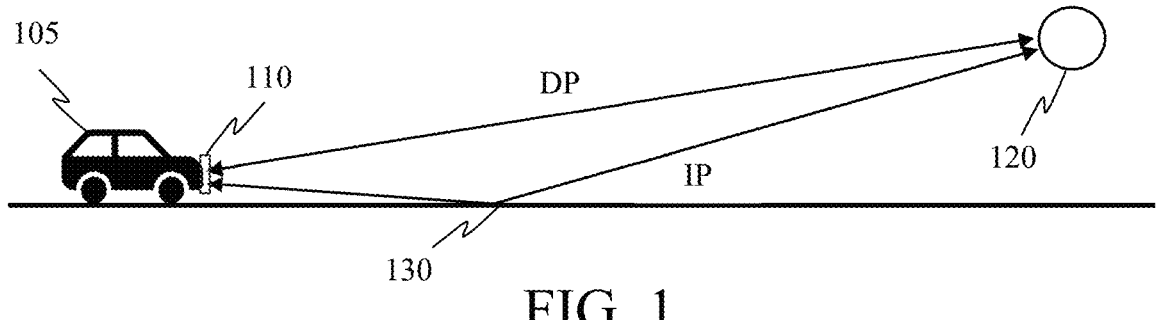
FIG. 1 is a simplified diagram illustrating two main paths of propagation for a radar signal and an echo signal between a radar and a target.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, a radar emulation system is able to emulate echo signals from emulated targets responsive to radar signal transmissions from a radar under test. The radar under test may be arranged stand-alone in a laboratory environment or on a vehicle, for example, such as an automobile or other mobile platform, depending on its anticipated use. The embodiments minimize reflections in the test environments to avoid interference, such as ghost targets, observed at the radar under test, caused by surfaces of objects other than the intended targets and ghost targets.

According to a representative embodiment, a system is provided for emulating multipath effects of a radar signal transmitted by a radar under test and reflected from an emulated target and at least one emulated surface, the radar under test including a radar transmitter and a radar receiver. The system includes multiple radar target simulators (RTSs) configured to generate and transmit multiple emulated echo signals having multiple different phases, respectively, in response to the radar signal transmitted by the radar under test, where at least one RTS of the multiple RTSs is configured to emulate the emulated target, receiving the radar signal via a direct path from the radar transmitter, and at least one other RTS of the multiple RTSs is configured to emulate at least one ghost target corresponding to the emulated target, receiving the radar signal via the direct path or an indirect path that includes the at least one emulated surface, the emulated surface reflecting the radar signal or at least one echo signal of the multiple emulated echo signals; and a controller configured to control the RTSs to generate and transmit the emulated echo signals at the different phases, respectively, where the different phases correspond to the RTSs receiving the radar signal from the radar transmitter and the radar receiver receiving the emulated echo signals from the RTSs over different combinations of the direct path and the indirect path to replicate interference effects caused by multipath propagation when testing the radar under test.

According to another representative embodiment, a method is provided for emulating multipath effects of a radar signal transmitted by a radar under test and reflected from an emulated target and at least one emulated surface, the radar under test including a radar transmitter and a radar receiver. The method includes providing multiple RTSs for generating and transmitting emulated echo signals having different phases, respectively, in response to a radar signal received from the radar under test; receiving the radar signal at a first RTS of the multiple RTSs via a direct path from the radar transmitter, where the first RTS is configured to emulate the emulated target; receiving the radar signal at at least one second RTS of the multiple RTSs via the direct path or an indirect path, which includes the at least one emulated surface that emulates reflection of the radar signal or corresponding echo signals, where the at least one second RTS is configured to emulate at least one ghost target corresponding to the emulated target; generating and transmitting a first emulated echo signal having a first phase at the first RTS, where the first emulated echo signal emulates reflection of the radar signal from the emulated target, and where the first phase is representative of propagation of both the radar signal and the first emulated echo signal along the direct path; and generating and transmitting at least one emulated echo signal having at least one second phase at the at least one second RTS, where the at least one second emulated echo signal emulates reflection of the radar signal from the at least one ghost target, and where the at least one second phase is representative of propagation of one or both the radar signal and the at least one second emulated echo signal along the indirect path. The radar receiver receives the first emulated echo signal having the first phase and the at least one second emulated echo signal having the at least one second phase, enabling testing of an ability of the radar to distinguish between the first emulated echo signal and the at least one second emulated echo signal to identify a location of the emulated target based on the first phase and the at least one second phase.

According to another representative embodiment, a system is provided for emulating multipath effects of a radar signal transmitted by a radar under test and reflected from multiple emulated targets and multiple emulated surfaces, the radar under test including a radar transmitter and a radar receiver. The system includes multiple RTSs and a controller. The RTSs are configured to generate and transmit multiple emulated echo signals having multiple different phases, respectively, in response to the radar signal transmitted by the radar under test, where multiple first RTSs of the RTSs are configured to emulate the emulated targets, receiving the radar signal via corresponding direct paths from the radar transmitter, and where multiple second RTSs of the RTSs are configured to emulate multiple ghost targets corresponding to the emulated targets, receiving the radar signal via the direct paths or via indirect paths that include the emulated surfaces, the emulated surfaces reflecting the radar signal or one or more emulated echo signals of the emulated echo signals. The controller is configured to control the RTSs to generate and transmit the emulated echo signals at the different phases, respectively, where the different phases correspond to the RTSs receiving the radar signal from the radar transmitter and the radar receiver receiving the emulated echo signals from the RTSs over different combinations of the direct path and the indirect path to replicate interference effects caused by multipath propagation when testing the radar under test.

FIG. 1 illustrates two main paths of propagation for a radar signal and an echo signal between a radar and a target. A radar 110 mounted on a vehicle 105, for example, where the radar 110 includes a radar transmitter for transmitting a radar signal to a target 120 and a radar receiver for receiving a corresponding echo signal reflected from the target 120. In this simplified scenario, there is the direct path DP between the radar 110 and the target 120, where the target 120 is an object in the direct path. There is also an indirect path IP between the radar 110 and the target 120 caused by reflection from a surface 130 of another object in the environment. In the depicted scenario the surface 130 is the surface of the road on which the vehicle is driving. The indirect path IP is necessarily longer than the direct path DP and in a different direction. The surface 130 reflects both the radar signal transmitted from the radar 110 and the echo signal reflected from the target 120, resulting in multipath interference. The multipath interference results in the radar 110 detecting ghost targets 121-123 at different distances and possibly different directions than the target 120. Of course, the surface 130 and/or additional surfaces in the field of view of the radar 110, may belong to any object detectable by the radar 110, such as curbs, guard rails, rocks, tires, debris, tree limbs, animals, and pedestrians, for example.

Figure 2A:
FIG. 2A is a simplified diagram illustrating a direct-direct path in which both the radar signal and the echo signal follow the direct path.

FIGS. 2A to 2D illustrate the possible paths of propagation for the radar signal and the echo signal between the radar and the target. In particular, FIG. 2A shows a direct-direct path in which both the radar signal and the echo signal follow the direct path DP. In this case, the position of the target 120 indicted to the radar 110 by the echo signal is the actual location of the actual target 120 since both the radar and echo signals propagate directly between the radar 110 and the target 120.

Figure 2B:
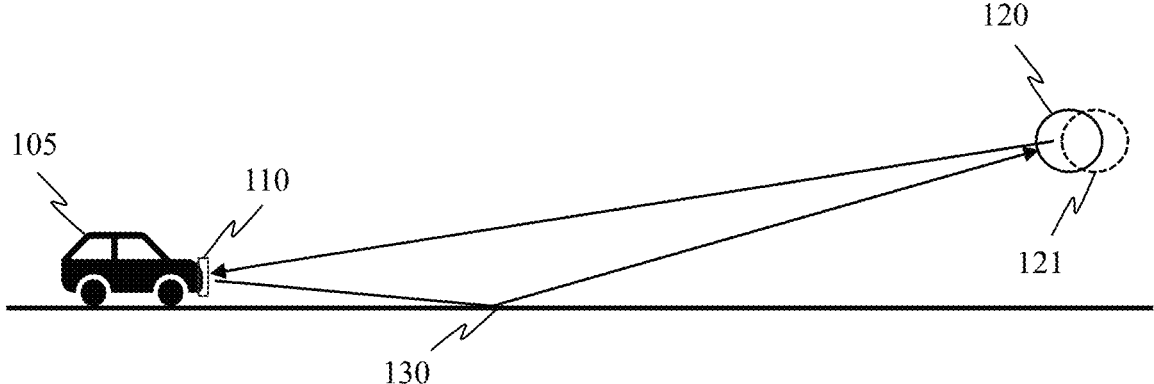
FIG. 2B is a simplified diagram illustrating an indirect-direct path in which both the radar signal and the echo signal follow the indirect path.

FIG. 2B shows an indirect-direct path in which the transmitted radar signal follows the indirect path IP and the reflected echo signal follows the direct path DP, circling in a counter-clockwise loop. That is, the radar signal is reflected off the surface 130 (e.g., road surface) and the returning echo signal propagates directly from the target 120 to the radar 110. The location of the target 120 indicted to the radar 110 by the echo signal is wrong, since the radar signal propagates indirectly from the radar 110 to the target 120, causing the radar 110 to see a ghost target 121 at a location further from the actual location. Since the echo signal propagates directly to the radar 110 along the direct path, the direction of the ghost target 121 as seen by the radar 110 is correct in that it is the same direction as the target 120.

Figure 2C:
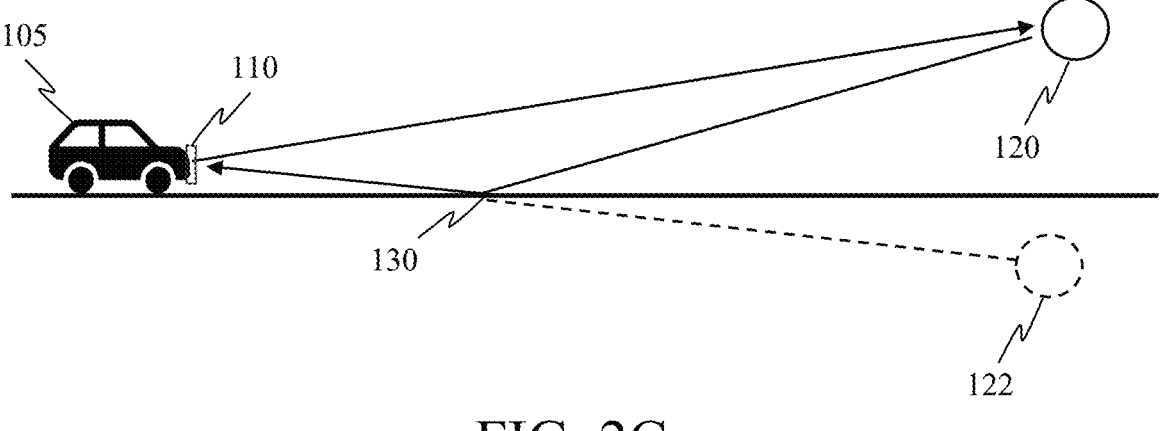
FIG. 2C is a simplified diagram illustrating a direct-indirect path in which the transmitted radar signal follows the direct path and the reflected echo signal follows the indirect path.

FIG. 2C shows a direct-indirect path in which the transmitted radar signal follows the direct path DP and the reflected echo signal follows the indirect path IP, circling in a clockwise loop. That is, the radar signal propagates directly to the target 120 and the returning echo signal is reflected off the surface 130. In this case, the location of the target 120 indicted to the radar 110 by the echo signal is wrong, since the echo signal propagates indirectly to the radar 110 from the target 120, causing the radar 110 to see a ghost target 122 at a location further from the actual location and in a different direction from the radar 110 than the actual location.

Figure 2D:
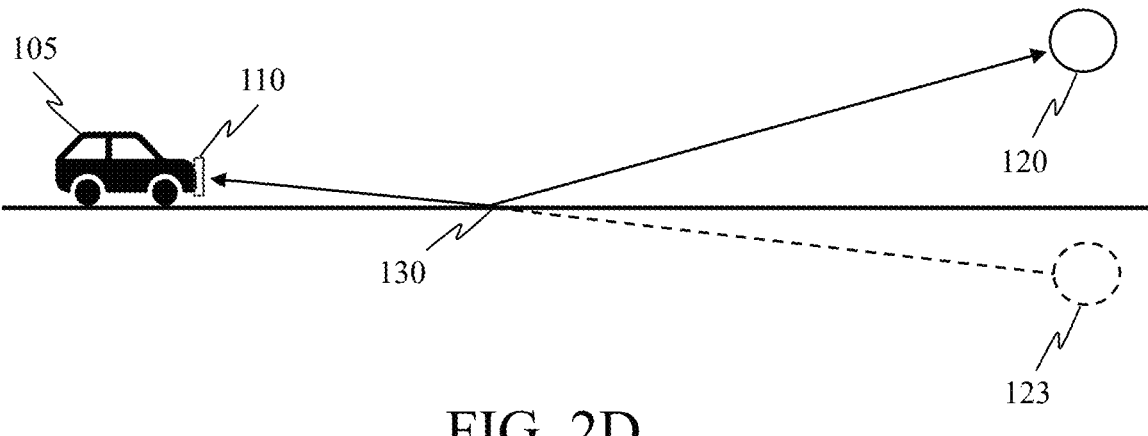
FIG. 2D is a simplified diagram illustrating an indirect-indirect path in which the transmitted radar signal follows the indirect path and the reflected echo signal follows the direct path.

FIG. 2D shows an indirect-indirect path in which both the radar signal and the echo signal follow the indirect path IP. That is, the radar and echo signals are reflected off the surface 130 in both directions. In this case, the location of the target 120 indicted to the radar 110 by the echo signal is wrong, since both the radar signal and the echo signal propagate indirectly between the radar 110 and the target 120, causing the radar 110 to see a ghost target 123. The ghost target 123 appears at a location further from the actual location of the target 120 (and further from the location of the ghost target 122) and in a different direction from the radar 110 than the actual location of the target 120.

In all scenarios, the radar 110 is capable of measuring the distance to the target 120. However, the radar 110 assumes propagation of the radar signal and echo signal along a straight line (direct path DP). Consequently, in this example, the radar 110 perceives four detections from two different directions and at slightly different distances, as shown in FIG. 3.

Figure 3:
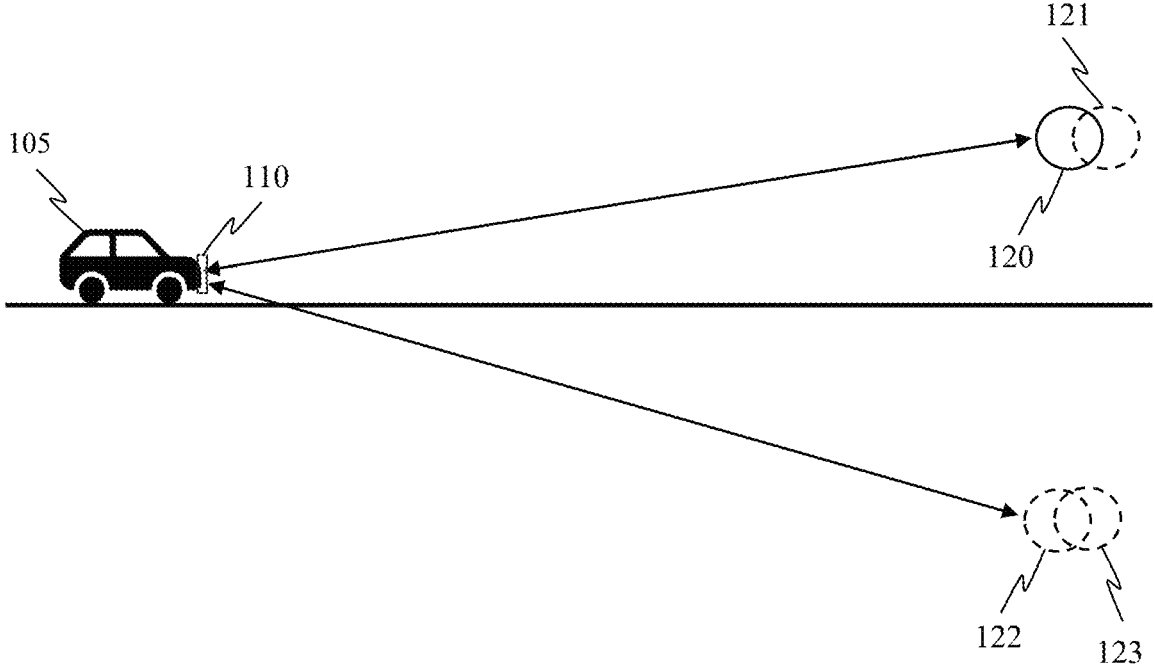
FIG. 3 is a simplified diagram illustrating a perspective of the radar receiving echo signals from the target and the ghost targets from two directions corresponding to the direct path and the indirect path.

That is, FIG. 3 is a simplified diagram illustrating the perspective of the radar 110 receiving echo signals from the target 120 and the ghost targets 121-123 from two directions corresponding to the direct path and the indirect path, respectively. Only the closest detection along the direct-direct path (shown in FIG. 2A) provides the actual location of the target 120 to the radar 110. The other paths result in detections at wrong locations where the ghost targets are perceived. The ghost targets 121-123 are shown with dashed lines to distinguish them from the actual target 120.

Whether the radar 110 can distinguish the detection of the actual target 120 from the detections of the ghost targets 121-123 depends on the resolution capabilities of the radar 110. In general, the distances between the target 120 and the ghost targets 121-123 in each direction are too small to be distinguished by the radar 110 (except for short-range radars). Additionally, the radar 110 may have a limited angular resolution in elevation, in which case, the radar 110 would be unable to distinguish between any of the four detections.

Figure 4:
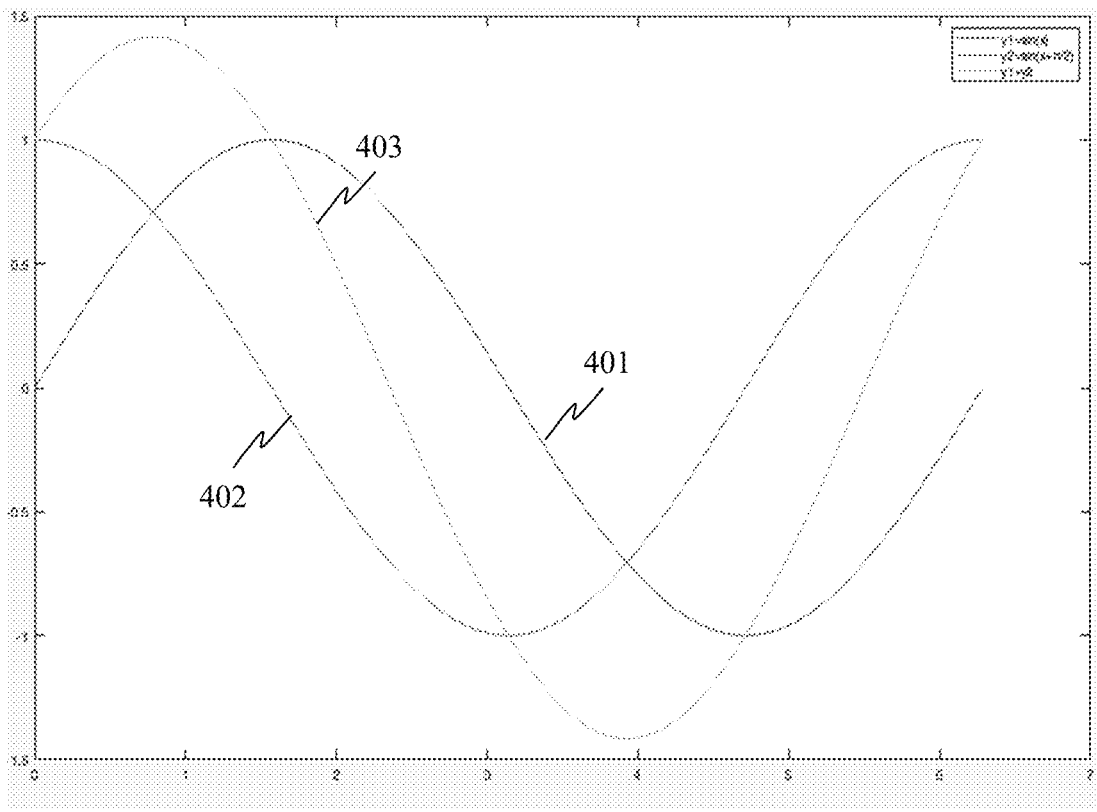
FIG. 4 is a graph showing the sum of multiple echo signals received by the radar from different paths.

When the radar 110 is unable to discriminate the echo signals from the actual target 120 and the different ghost targets 121-123 due to insufficient resolution capabilities, the perception of the radar 110 is determined by the sum of those echoes. FIG. 4 is a graph showing the sum of such multiple echo signals received by the radar 110 from different paths. When summing the multiple echo signals, the result depends on the amplitude, frequency, and phase of the individual echo signals. In the example shown by FIG. 4, trace 401 shows first sine-wave (y1), trace 402 shows second sine-wave (y2), and trace 403 shows a resulting sine-wave, which is the sum of the first and second sine-waves (y1+y2).

The second sine-wave (y2) is phase shifted by 90 degrees (½π) from the first sine-wave (y1), such that y1=sin (x) and y2=sin (x+π/2).

For purposes of discussion, an important property is the amplitude of the sum of the first and second sine-waves. As shown in FIG. 4, the amplitude of the resulting sine-wave shown by trace 403 depends on both the amplitudes and relative phases of the traces 401 and 402, assuming identical frequencies, which provides sufficient approximation. For example, Doppler shifts for the different propagation paths may be ignored when the vehicle 105 and/or the surface 130 are moving relative to one another, since the differences in the Doppler shifts would be negligible. Dependent on the phases of the first and second sine-waves, the amplitude of the resulting sine-wave can increase but also decrease.

In the depicted scenario, the phase relations between the returning echo signals depend on the differences of the distances traveled along the respective paths to and from the target 120. This in turn is a function of the distance between vehicle 105 and target 120 and the height of both the radar 110 and the target 120 above the surface 130 (e.g., road surface).

Figure 5:
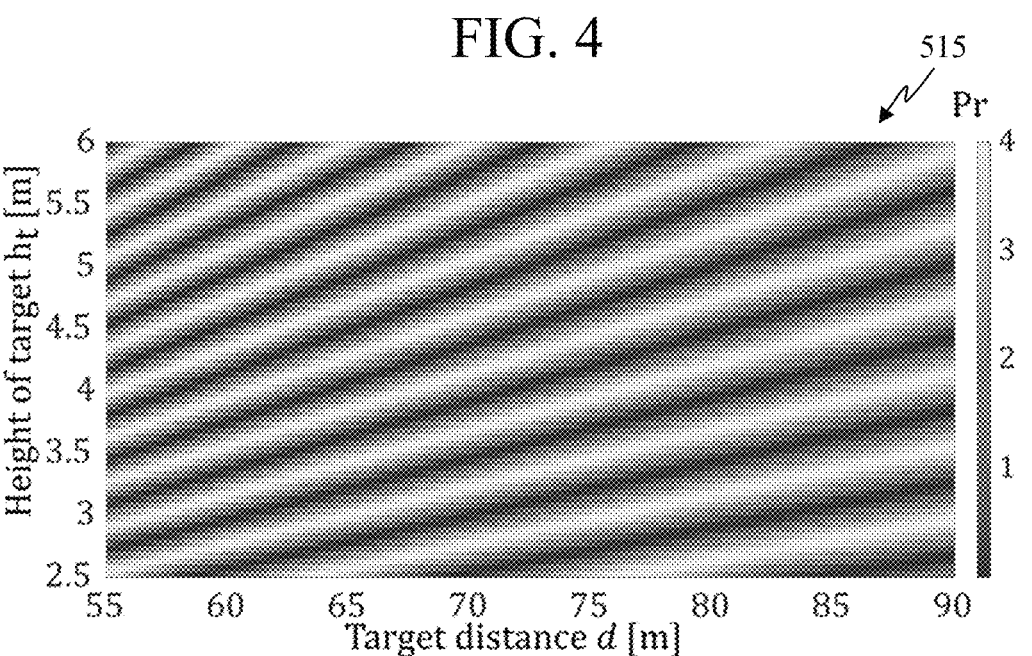
FIG. 5 shows simulation results of a scenario depicted in FIGS. 2A-2D for different combinations of heights of the target and distances from the radar under test.

FIG. 5 shows simulation results of a scenario depicted in FIGS. 2A-2D for combinations of heights of the target 120 and distances from the radar 110. For purposes of explanation, the radar 110 is at a fixed height of 0.5 m above the road, for example. The shading reflects the resulting amplitude when the four echo signals are adding up, where light gray is high intensity (large amplitude) and dark gray is low intensity (small amplitude). The resulting pattern 515 of the light and dark gray areas is caused by self-interference between the returning echo signals along the different paths. For some combinations of distances and heights, the returning each signals cancel each other out. For other combinations, the returning echo signals add together. When the vehicle 105 moves towards the target 120, the radar 110 perceives a fluctuation in perceived intensity. The frequency of these fluctuations measured over distance may be used to estimate the height at which the target 120 is located. The embodiments described herein enable emulation of these results.

Figure 6:
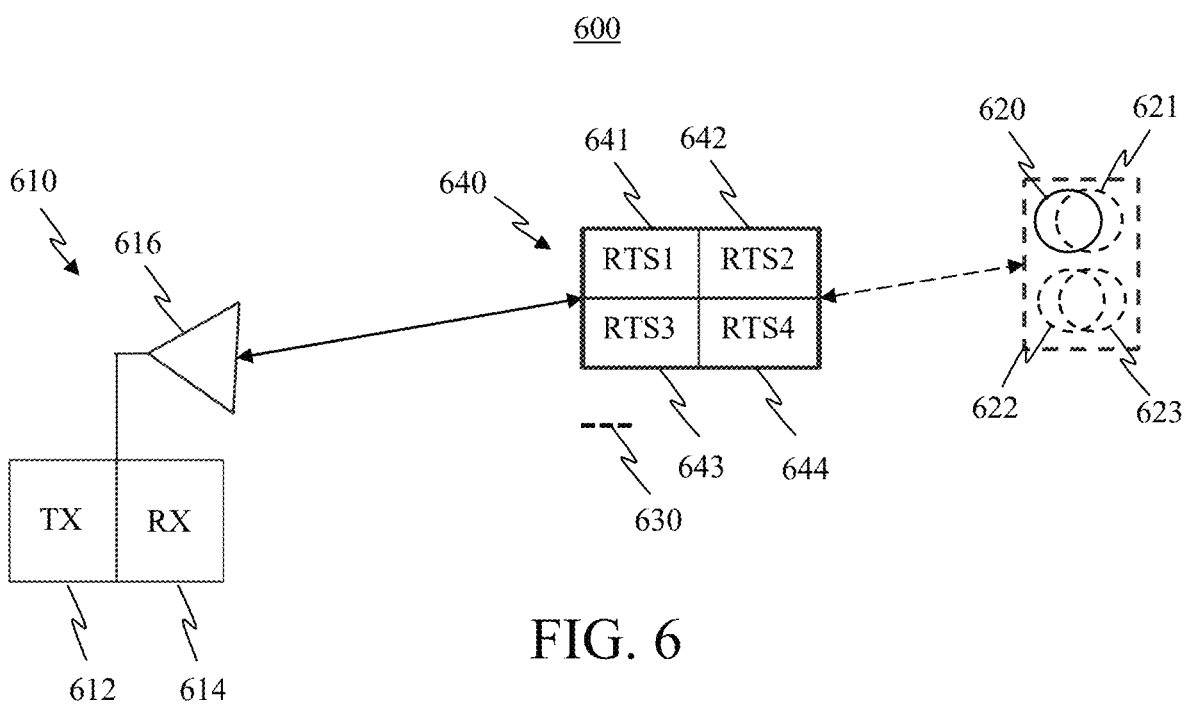
FIG. 6 is a simplified block diagram showing a system for emulating multipath effects of radar for a radar under test, according to a representative embodiment.

FIG. 6 is a simplified block diagram showing a system for emulating multipath effects of radar for a radar under test, according to a representative embodiment. As will be appreciated by one of ordinary skill in the art having the benefit of the present disclosure, one likely radar is automotive radar used in various capacities in current and emerging automobile applications. However, it is emphasized that the presently described multipath emulation system is not limited to automotive radar systems, and can be applied to other types of vehicles that could employ a vehicular radar system, including trucks, busses, motorcycles, bicycles, motorized bicycles (e.g., scooters), and aircraft, for example.

Referring to FIG. 6, system 600 in includes an actual radar 610 as the radar under test. The radar 610 includes a radar transmitter (TX) 612, a radar receiver (RX) 614 and an antenna 616, which may be a steerable antenna and/or an antenna array, for example. Although shown as a single antenna, the antenna 616 may be implemented as separate transmit and receive antennas dedicated to the radar transmitter 612 and the radar receiver 614, respectively. The radar transmitter 612 is configured to transmit a radar signal via the antenna 616 toward an emulated target 620, and the radar receiver 614 is configured to receive multiple emulated echo signals via the antenna 616 from the emulated target 620, as well as emulated echo signals from the emulated ghost targets 621-623, in response to simulated reflection of the radar signal. Due to multipath effects, the radar receiver 614 detects locations of the emulated target 620 as well as the emulated ghosts targets 621-623, as discussed above.

The system 600 further includes multiple radar target simulators (RTSs) configured to generate and transmit RF signals as the emulated echo signals reflected from the emulated target 620. Reference to RTSs is intended to include miniature RTSs (mRTSs). For ease of illustration, the depicted embodiment includes four RTSs in order to emulate just four combinations of direct and indirect path scenarios discussed above with reference to FIGS. 2A-2D, where each indirect path is defined by an emulated surface 630 (e.g., road surface) located between the radar 610 and the emulated target 620. Generally, though, one RTS is needed for each combination of direct and indirect paths to be emulated, the number of which increases as the number of emulated targets and/or emulated surfaces increases, or as the number of emulated reflecting surfaces of a single object increases, for example.

In the depicted embodiment, the four RTSs are arranged in a single RTS instance 640, which are located in substantially the same physical location in the system 600, and are indicated as first RTS 641 (RTS1), second RTS 642 (RTS2), third RTS 643 (RTS3), and fourth RTS 644 (RTS4). It is understood, however, the system 600 may include any number of RTSs for emulating echo signals from multiple emulated targets and associated ghost targets, without departing from the scope of the present teachings.

As discussed above, the radar 610 transmits the radar signals toward the emulated target 620 along direct and indirect paths, and the emulated target 620 reflects emulated echo signals back toward the radar 610 along different combinations of the direct and indirect paths, as discussed above, where each indirect path is defined by the emulated surface 630 (e.g., road surface). That is, the emulated surface 630 reflects the radar signals transmitted by the radar transmitter 612 toward the emulated target 620, and reflects the emulated echo signals reflected by the emulated target 620 and the emulated ghost targets 621-623 toward the radar receiver 614.

In the depicted embodiment, the system 600 includes one emulated surface, emulated surface 630, for ease of illustration. It is understood, however, the system 600 may include any number of emulated surfaces for reflecting the radar and emulated echo signals, without departing from the scope of the present teachings. Each emulated surface would create a different indirect path between the radar 610 and the emulated target 620, resulting in corresponding ghost targets that create additional multipath effects that are handled the same as the multipath effects created by the emulated target 620, described above.

The emulated echo signals generated by the first to fourth RTSs 641-644 are transmitted over the air to the radar receiver 614. In the depicted configuration, the first RTS 641 emulates echo signals from emulated target 620 following a direct-direct path, the second RTS 642 emulates echo signals from emulated ghost target 621' following an indirect-direct path, the third RTS 643 emulates echo signals from emulated ghost target 622 following a direct-indirect path, and the fourth RTS 644 emulates echo signals from the emulated ghost target 623 following an indirect-indirect path. The emulated ghost targets 621-623 result from the radar signals and/or the emulated echo signals propagating in the indirect path defined by the emulated surface 630, mentioned above.

In order to emulate the different times required for the radar signals and corresponding emulated echo signals to travel the different combinations of the direct and indirect paths, the first to fourth RTSs 641-644 are configured to generate the emulated echo signals to have different output phases, respectively, where the output phases of the first to fourth RTSs 641-644 are separately adjustable. The different phases respectively correspond to the emulated target 620 and the emulated ghost targets 621-623 receiving the radar signal, and the radar receiver 614 receiving the corresponding emulated echo signals over the different combinations of the direct and indirect paths. The different phases thus replicate the self-interference effects caused by multipath propagation. The phases are derived from the distances (lengths) of the different paths of propagation traveled by the radar and emulated echo signals between the radar 610 and each of the emulated target 620 and the emulated ghost targets 621-623. The accuracy and resolution of the different distances need only be better than the range resolution of the radar 610. The phases must be controlled to a fraction of the wavelength of the radar signal transmitted by the radar transmitter 612.

For increased accuracy, the RTSs may be split up into different locations. In this case, the RTSs may be placed at angles corresponding to actual directions from which the reflected simulated echo signals are received. In this context, FIG. 7 is a simplified block diagram showing a system for emulating multipath effects of radar signals for a radar under test using multiple instances of RTSs, according to a representative embodiment.

Figure 7:
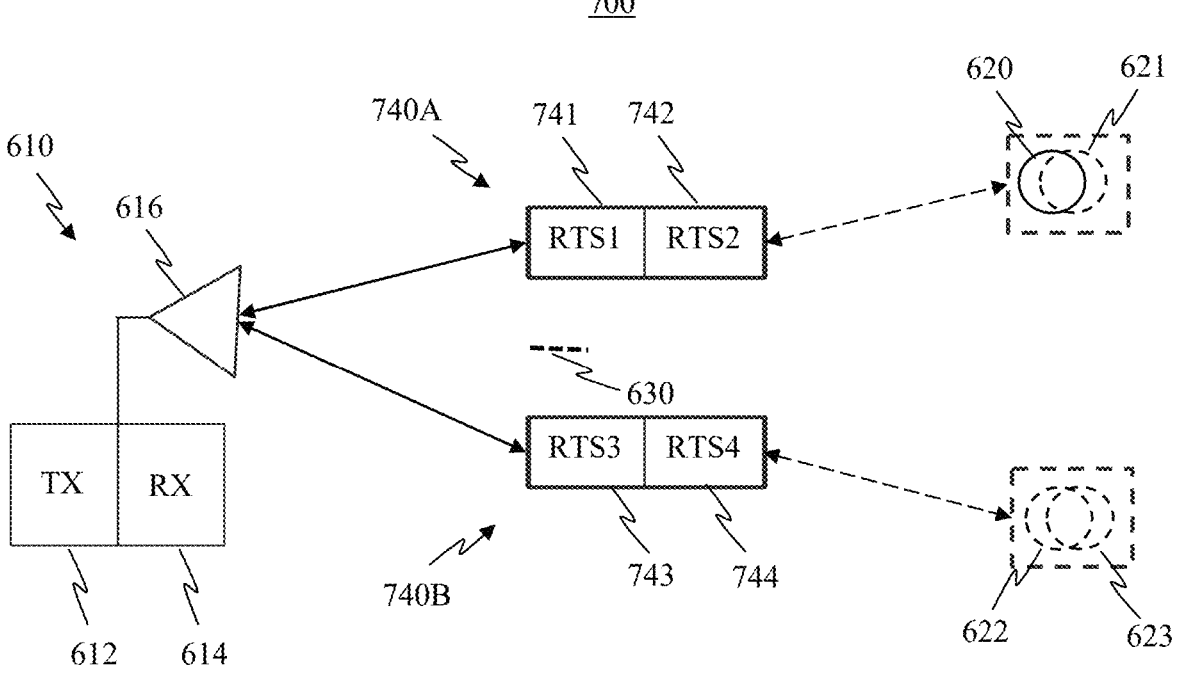
FIG. 7 is a simplified block diagram showing a system for emulating multipath effects of radar for a radar under test, according to a representative embodiment.

Referring to FIG. 7, system 700 in includes the actual radar 610 as the radar under test. As discussed above, the radar transmitter 612 of the radar 610 is configured to transmit a radar signal via the antenna 616 toward the emulated target 620, and the radar receiver 614 is configured to receive emulated echo signals via the antenna 616 from the emulated target 620 in response to emulated reflection of the radar signal from the emulated target 620, as well as emulated echo signals from the emulated ghost targets 621-623. The emulated ghost targets 621-623 result from the radar signals and/or the emulated echo signals propagating in an indirect path, which is defined by an emulated surface 630 (e.g., road surface), mentioned above. Due to multipath effects, the radar receiver 614 detects the locations of the emulated target 620 as well as the ghosts targets 621-623, as discussed above.

The system 700 further includes multiple RTSs configured to generate and transmit RF signals as the emulated echo signals reflected from the emulated target 620 and the emulated ghost targets 621-623. Again, for ease of illustration, the depicted embodiment includes four RTSs in order to emulate the four combinations of direct and indirect path scenarios discussed above with reference to FIGS. 2A-2D. The four RTSs are arranged in two RTS instances, indicated by first RTS instance 740A and second RTS instance 740B. The first RTS instance 740A is located at a first physical location in the system 600 that substantially corresponds to the direct path between the radar 610 and the emulated target 621-623. The second RTS instance 740B is located at a second physical location in the system 600 that substantially corresponds to the indirect path between the radar 610 and the emulated surface 630 that reflects the radar and emulated echo signals.

In the depicted embodiment, the first RTS instance 740A includes first RTS 741 (RTS1) and second RTS 642 (RTS2), and the second RTS instance 740B includes third RTS 743 (RTS3) and fourth RTS 744 (RTS4). In this configuration, the first RTS 741 emulates echo signals from emulated target 620 following a direct-direct path, and the second RTS 742 emulates echo signals from emulated ghost target 621 following an indirect-direct path. Therefore, the radar receiver 614 sees the emulated echo signals from the first and second RTSs 741 and 742 as arriving from the direction of the emulated target 620. The third RTS 743 emulates echo signals from emulated ghost target 622 following a direct-indirect path, and the fourth RTS 744 emulates echo signals from the emulated ghost target 623 following an indirect-indirect path. Therefore, the radar receiver 614 sees the emulated echo signals from the third and fourth RTSs 743 and 744 as arriving from the direction of the emulated surface 730 (point of reflection). As discussed above, although only four RTSs are shown, it is understood that the system 700 may include any number of RTSs for emulating echo signals from multiple emulated targets and associated ghost targets, grouped in one or more instances, without departing from the scope of the present teachings.

As discussed above, in order to emulate the different times required for the radar signals and corresponding emulated echo signals to travel the different combinations of the direct and indirect paths, the first to fourth RTSs 741-744 are configured to generate the emulated echo signals to have different output phases, respectively. The different phases correspond to the emulated target 620 and the emulated ghost targets 621-623 receiving the radar signal, and the radar receiver 614 receiving the corresponding emulated echo signals over the different combinations of the direct and indirect paths. The different phases of the emulated echo signals generated by the first to fourth RTSs 741-744 thus replicate the self-interference effects caused by multipath propagation.

Generally, the configuration of the system 700 is more accurate than the configuration of the system 600, in which the RTSs has been placed in one location. System 700 is especially useful when the radar 610 has limited capabilities with regard to measuring elevation. In this case, when the radar 610 (e.g., mounted in a vehicle) is approaching an object, there can be a transition from when the radar 610 detects the combined inference by signals from RTSs in all four paths to when the radar 610 can distinguish between the direct returns from one direction and indirect returns (of the object) from another direction. The angle between the two directions becomes wider with decreasing distance between the radar 610 and the object. Consequently, at some point, the angle can exceed the angular resolution limits of the radar 610. Therefore, the configuration of the system 700 is more accurate, although it is still necessary that the output phases of the RTSs be controlled with respect to each other, even though they are spaced further apart.

The phases associated with the different propagation paths may be determined based on the geometric relationships between the radar under test and the target being emulated. For example, the phases of the first to fourth RTSs 641-644 of the system 600 may be provided using a AD1012A Radar Scene Emulator (RSE), available from Keysight Technologies, Inc., which includes an array of mRTSs to act as the first to fourth RTSs 641-644. The mRTSs may be arranged in a curved screen in front of the radar under test (radar 610).

Figure 8:
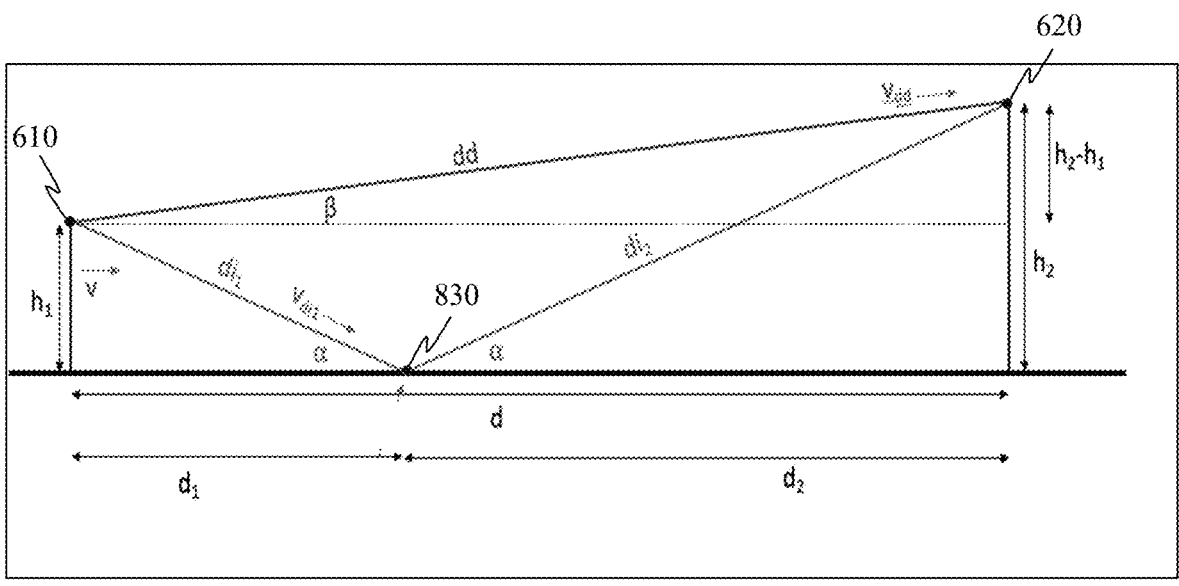
FIG. 8 depicts a mathematical model of geometric relationships between a radar under test and an emulated target, according to a representative embodiment.

The geometric relationships, as well as velocities and output phases, may be derived from FIG. 8, for example, which depicts a model of geometric relationships between the radar 610 and the emulated target 620, according to a representative embodiment.

Referring to FIG. 8, the radar 610 is at a height $h_1$ above the reference (e.g., road), and the emulated target 620 is at a height $h_2$ above the reference at a horizontal distance d from the radar 610. The input parameters of FIG. 8 include the height $h_1$ of the radar 610, the height $h_2$ of the emulated target 620 (for this example with the simplification that $h_2 > h_1$), the horizontal distance d between the radar 610 and the emulated target 620, and velocity v of the radar 610 (e.g., mountable on a car) moving in a direction toward the emulated target 620 (with v>0). Adding the velocity v increases the complexity of the calculations only slightly. The velocity v may be included by emulating vertical and/or horizontal movements of the radar 610 and/or the emulated target 620 by handing off generation of the emulated echo signals from one mRTS to another, for example, as is done when displaying movement of an object on a video monitor, as would be apparent to one skilled in the art.

The direct distance dd between the radar 610 and emulated target 620, which corresponds to the direct path, may be calculated using the Pythagorean Theorem, according to Equation (1):

$$dd = \sqrt{(h_2 - h_1)^2 + d^2} \qquad (1)$$

The indirect path is caused by specular reflection from an emulated surface of an object, which is shown in FIG. 6 as the emulated surface 630 and indicated in FIG. 8 as specular reflection point 830. The reflection point 830 is the location where the indirect path is assumed to reflect from a road surface, for example. Consequently, the two angles α are identical, and the two triangles formed on either side of the reflection point 830 are similar, leading to Equation (2):

$$\frac{d_1}{h_1} = \frac{d_2}{h_2} \qquad (2)$$

As shown in FIG. 8, the horizontal distance d is $d_1 + d_2$. Therefore, $d_1$ may be solved for using Equations (3)-(6):

$$\frac{d_1}{h_1} = \frac{d - d_1}{h_2} \qquad (3)$$

$$d_1 h_2 = dh_1 - d_1 h_1 \qquad (4)$$

$$d_1(h_2 + h_1) = dh_1 \qquad (5)$$

$$d_1 = d\frac{h_1}{h_1 + h_2} \qquad (6)$$

Then, due to symmetry, $d_2$ may be solved for using Equation (7):

$$d_2 = d\frac{h_2}{h_1 + h_2} \qquad (7)$$

Finally, indirect distances $di_1$ and $di_2$ of the indirect path may be calculated from the $d_1$ and $d_2$, again using the Pythagorean Theorem, according to Equations (8) and (9):

$$di_1 = \sqrt{d_1^2 + h_1^2} \qquad (8)$$

$$di_2 = \sqrt{d_2^2 + h_2^2} \qquad (9)$$

The effective distances may be calculated from the direct distance dd and the indirect distances $di_1$ and $di_2$. The effective distances are the distances at which the radar 610 perceives the corresponding emulated target 620 and emulated ghost targets 621-623. Therefore, the effective distances are the distances to be programmed into the mRTSs that generate the corresponding emulated echo signals. The radar 610 assumes propagation along a straight line. Consequently, each effective distance is the total distance traveled back and forth by the radar signal and corresponding echo signal divided by two. Table 1, below, provides a summary of the results for the various effective distances.

The output phases may also be calculated from the direct distance dd and the indirect distances $di_1$ and $di_2$. The output phase is the remainder of the total distance traveled by the radar wave divided by the wavelength of the radar signal. This is the same as twice the effective distance modulo the wavelength (λ) of the radar signal. The formulas for calculating the output phases for the distances of the various combinations of direct and indirect paths are also shown in Table 1. The conversion in a phase angle is not shown here.

Further, as mentioned above, the velocity v may be added. Therefore, for ease of explanation, only the movement of the radar 610 (e.g., automobile) is modeled, while the emulated target 620 is assumed to be stationary. Consequently, a Doppler shift may only be observed along the direct path between radar 610 and the emulated target 620, indicated by direct velocity $V_{dd}$, in the direct path, and between the radar 610 and the reflection point 830 (e.g., road), indicated by indirect velocity Vail, in the indirect path. With regard to the path between the reflection point 830 and the emulated target 620, both ends are stationary and therefore no Doppler shift occurs.

The Doppler shift is caused by only the radial component of the velocity vector. Therefore, direct velocity $V_{dd}$ and the indirect velocity Vail may be represented by Equations (10) and (11):

$$v_{dd} = v \cos \beta \qquad (10)$$

$$v_{di1} = v \cos \alpha \qquad (11)$$

Knowing that $$\beta = \tan^{-1}\frac{h_2 - h_1}{d},$$

the direct velocity $v_{dd}$ may be derived using Equation (12):

$$v_{dd} = v\cos\left(\tan^{-1}\frac{h_2 - h_1}{d}\right) \qquad (12)$$

Also, knowing that $$\alpha = \tan^{-1}\frac{h_1}{d_1} \text{ and } d_1 = d\frac{h_1}{h_1 + h_2}$$

(discussed above), the indirect velocity Vail may be derived using Equations (13)-(15):

$$\alpha = \tan^{-1}\frac{h_1(h_1 + h_2)}{dh_1} \qquad (13)$$

$$\alpha = \tan^{-1}\frac{h_1 + h_2}{d} \qquad (14)$$

-continued $$v_{di1} = v \cos\left(\tan^{-1}\frac{h_1 + h_2}{d}\right) \tag{15}$$

There is a 180 degree phase shift for horizontally polarized radars at the reflection point 830, which is not reflected in Table 1. However, the embodiments described herein apply to all types of polarization. The resulting effective distances, velocities, and output phases are shown in Table 1:

TABLE 1

| Path | Effective Distance | Effective Velocity | Output Phase |
|---|---|---|---|
| Direct-Direct | dd | $v_{dd}$ | (2 dd) modulo $\lambda$ |
| Indirect-Indirect | $di_1 + di_2$ | $v_{di1}$ | $(2(di_1 + di_2))$ modulo $\lambda$ |
| Direct-Indirect | $(dd + di_1 + di_2)/2$ | $(v_{dd} + v_{di1})/2$ | $(dd + di_1 + di_2)$ modulo $\lambda$ |
| Indirect-Direct | $(dd + di_1 + di_2)/2$ | $(v_{dd} + v_{di1})/2$ | $(dd + di_1 + di_2)$ modulo $\lambda$ |

The mRTSs are controlled by a controller (discussed below) to apply the output phases for the different paths to the emulated echo signals, including the emulated echo signal from the emulated target and the emulated echo signals from the emulated ghost targets. The output phases can be applied by adjusting the delay through the mRTS with sufficiently fine resolution and accuracy, or by converting the output phase to an angle and directly adjusting the angle using a modulator.

Notably, both the radar 610 and the mRTSs are operating with the distance in one direction. This assumes that each of the radar signal and the corresponding echo signal is traveling the same way in either direction, respectively. Consequently, the accurate calculation is the complete distance travelled in both directions divided by two.

Similarly, for the Doppler shift, it is assumed that each of the radar signal and the corresponding echo signal is traveling the same direction, respectively, and therefore the same Doppler shift is occurring twice. This has to be accounted for when setting the radial velocities for the individual (ghost) targets in the mRTSs. For example, to determine the Doppler shift, it does not matter whether the origin of the wave (e.g., the radar signal) or the end point (e.g., a target) is moving. Only the relative velocity between the two is important. Therefore, in this example, for the direct-direct path, the Doppler shift corresponding to the direct velocity $v_{dd}$ is observed when the radar signal travels from the radar 610 to the target 620. The same Doppler shift is observed for the reflected echo signal in the opposite direction. So both Doppler shifts are added together. For the direct-indirect path, for example, the Doppler shift is observed on the path from the radar 610 to the emulated target 620. There is no additional Doppler shift on the path from the target 620 to the reflecting surface (e.g., road surface) indicated by the reflection point 830. But, on the final path from the reflecting surface to the radar 610, there again is a Doppler shift, which corresponds to $v_{di1}$. As for distance, the radar 610 assumes a direct-direct propagation and therefore, when it determines a Doppler shift, it assumes that the Doppler shift was caused by equal parts on the way to and on the way back from the target 620. Therefore, overall summed up velocities are divided by 2.

When an electromagnetic wave is reflected off a surface, a phase shift can occur, depending on the polarization of the radar 610 and the orientation of the surface with respect to this polarization. As mentioned above, in this example, the reflection point 830 represents a point on the horizontal surface of a road. Therefore, a 180 degree phase shift has to be added for any reflection at the reflection point 830 for horizontally polarized radars for each of the direct-indirect path and the indirect-direct path. The phase shift adds up to 360 degrees for the indirect-indirect path, which is equivalent to no phase shift. When the radar 610 is vertically polarized, there is no phase shift at the reflection point 830, and therefore the effect of the 180 degree phase shift is not reflected in the equations above. Also, for the output phase, Table 1 includes the phase relation due to the geometric, but does not include additional phase shifts due to physical effects at the reflection point 830.

A configuration analogous to that shown in FIG. 7 was used to test an AWR1642 Single-chip 76-GHz to 81-GHz automotive radar sensor, available from Texas Instruments Incorporated, according to a representative embodiment. The test system was an AD1012A Radar Scene Emulator, available from Keysight Technologies, Inc. The radar was configured for long range operation of up to 93 m and a range resolution of 38 cm.

During the test, one transmit antenna and one receive antenna were used, so the radar had no notion of detection of arrival. Therefore, any of the mRTSs in the test setup could be used for emulating the echo signals, so four mRTSs in the two center rows were selected. When programming the mRTSs, the calculated distances were rounded to 1 cm precision, which is well below the resolution capability of the radar under test.

Before running the test, the output phases of the mRTSs were aligned during a calibration process. Then, additional phase for generating the self-interference effect as calculated above was added.

Figure 9:
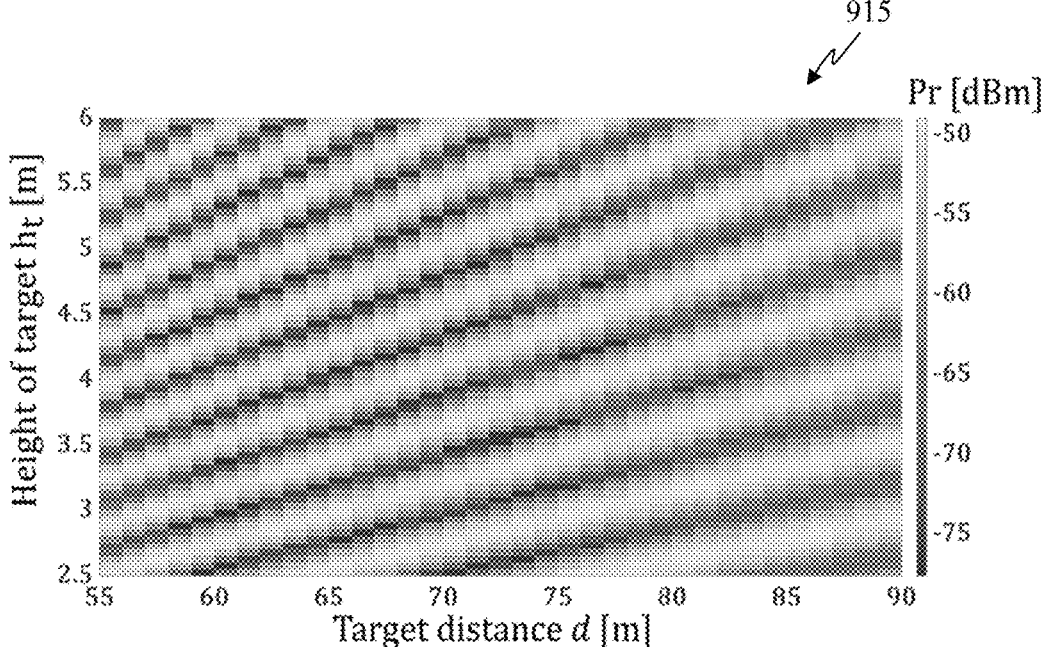
FIG. 9 shows test results of a scenario for a radar under test for different combinations of heights of the target and distances from the radar under test, according to a representative embodiment.

FIG. 9 shows test results of a scenario for the radar under test configured as described above for different combinations of heights of the target and distances from the radar under test, according to a representative embodiment. The test results show measured intensities at the radar, where shading reflects the resulting amplitude when the echo signals are adding up. As discussed above with reference to FIG. 5, light gray is high intensity (large amplitude) and dark gray is low intensity (small amplitude). The resulting pattern 915 of the light and dark gray areas is caused by self-interference between the returning echo signals along the different paths. As can be seen, there is excellent agreement with the simulation results shown in FIG. 5, indicating that the test setup according to the representative embodiment accurately models the multi-path, self-interference effects of radar.

Figure 10:
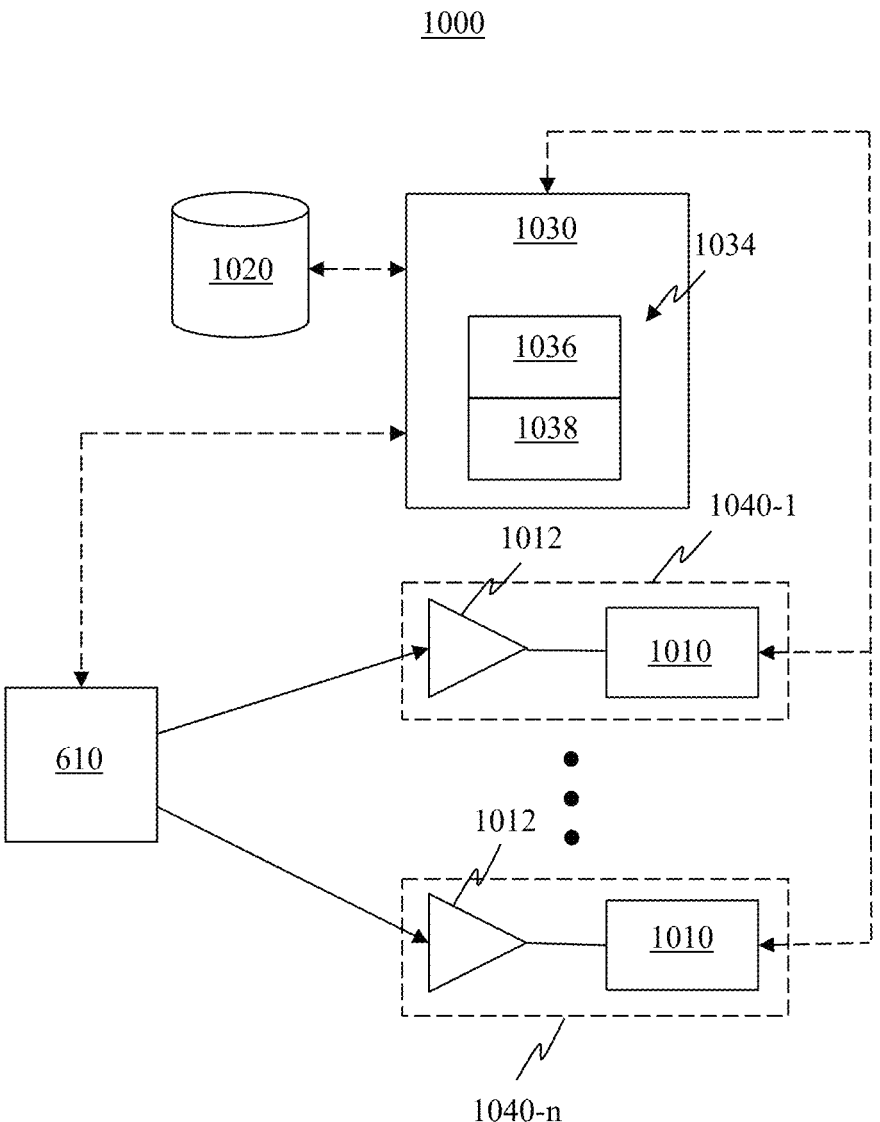
FIG. 10 is a simplified block diagram showing a system in more detail for emulating multipath effects of radar for a radar under test, according to a representative embodiment.

FIG. 10 is a simplified block diagram showing a system 1000 for emulating multipath effects of radar for a radar under test, according to a representative embodiment. The system 1000 shows an illustrative implementation of the systems 600 and 700, for example, in more detail.

Referring to FIG. 10, the system 1000 includes multiple RTSs, indicated by first RTS 1040-1 to nth RTSs 1040-*n*. The first to nth RTSs 1040-1 to 104-*n* may be arranged on a curved screen in front of the radar under test, radar 610. Each of first to nth RTSs 1040-1 to 1040-*n* includes at least one antenna 1012 and at least one transceiver-receiver combination 1010, which may be an mRTS, for example.

The system 600 also includes a computer 1030 with a controller 1034. The controller 1034 described herein may include a combination of memory 1036 that stores instructions and an illustrative processor 1038 that executes the stored instructions in order to implement all or part of the processes described herein. A database 1020 may store information to be used for target and reflecting surface emulation, including various predetermined scenarios that have one or more targets and reflecting surfaces.

The controller 1034 may be housed within or linked to a workstation such as a computer or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling application of various principles as described in the present disclosure. The structural configuration of the controller 1034 may include, but is not limited to, processor(s), computer-usable/computer readable storage medium(s), an operating system, application module(s), peripheral device controller(s), slot(s) and port(s), as discussed below.

Additionally, although the computer 1030 and/or the controller 1034 show components networked together, multiple components may be integrated into a single system. For example, the computer 1030 and/or the controller 1034 may be integrated with a display (not shown). On the other hand, the networked components of the computer 1030 and/or the controller 1034 may also be spatially distributed such as by being distributed in different rooms or different buildings, in which case the networked components may be connected via data connections.

In the depicted embodiment, the computer 1030 includes the controller 1034, which includes memory 1036, processor 1038, as well as user and/or network interfaces (not shown) and a display (not shown). The computer 1030 and/or the controller 1034 may be implemented as a processing unit. In various embodiments, the processing unit may include one or more computer processors (e.g., processor 1038), digital signal processors (DSPs), central processing units (CPUs), field-programmable gate arrays (FPGAs), application specific integrated circuits (ASICs), or combinations thereof, using any combination of hardware, software, firmware, hard-wired logic circuits, or combinations thereof. Each of the computer 1030, the controller 1034 and/or the processor 1038 may include its own processing memory (e.g., memory 1036) for storing computer readable code (e.g., software, software modules) that enables performance of the various functions described herein. For example, the processing memory may store software instructions/computer readable code executable by the processing unit (e.g., computer processor) for performing some or all aspects of methods described herein, including various steps of the method described below with reference to FIG. 11. That is, execution of the instructions/computer readable code generally causes the processing unit of the computer 1030 and/or the controller 1034 to emulate echo signals reflected from emulated targets in response to the radar signals transmitted by the radar under test.

The memory 1036, and any other memory described herein, including the database 1020, may be various types of random access memory (RAM), read only memory (ROM) and/or other storage media, including flash memory, electrically programmable read-only memory (EPROM), electrically erasable and programmable read only memory (EEPROM), compact disk read only memory (CD-ROM), digital versatile disk (DVD), registers, latches, flip-flops, a hard disk, a removable disk, tape, floppy disk, blu-ray disk, or universal serial bus (USB) driver, or any other form of storage medium known in the art, which are tangible and non-transitory (e.g., as compared to transitory propagating signals). Memories may be volatile or non-volatile, secure and/or encrypted, unsecure and/or unencrypted, without departing from the scope of the present teachings. The memory 1036 and the database 1020 may be representative of one or more memories and databases, as well as multiple memories and databases, including distributed and networked memories and databases.

Figure 11:
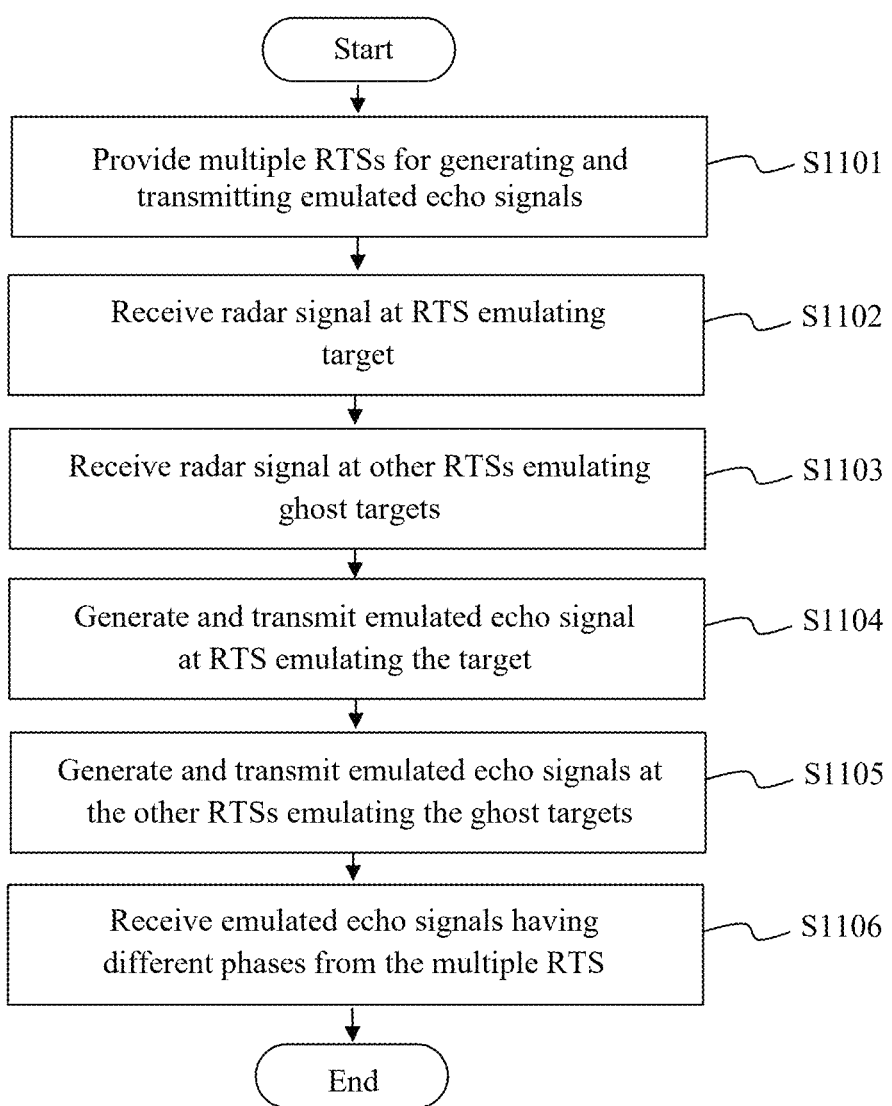
FIG. 11 is a flow diagram showing a method for emulating multipath effects of a radar signal transmitted by a radar under test and reflected from an emulated target and at least one emulated surface, according to a representative embodiment.

FIG. 11 is a flow diagram showing a method for emulating multipath effects of a radar signal transmitted by a radar under test and reflected from an emulated target and at least one emulated surface, according to a representative embodiment. The radar under test includes a radar transmitter for transmitting the radar signal and a radar receiver for receive emulated echo signals via direct and indirect paths. Although presented in numerical order, it is understood steps of the depicted flow diagram may be performed in different orders and/or substantially simultaneously without departing from the scope of the present teachings.

Referring to FIG. 11, in step 1101, multiple RTSs are provided in a test system for generating and transmitting emulated echo signals having different phases, respectively, in response to a radar signal receive from the radar under test. The RTSs may be in different physical locations in the test facility to emulate different positions of an emulated target and emulated ghost targets resulting from at least one emulated surface that reflects transmitted radar signals and emulated echo signals. Generally, the positions of the emulated ghost targets are affected by the position of the target and the position and orientation of the at least one emulated surface.

In block S1102, the radar signal is received at an RTS of the multiple RTSs, which is configured to emulate the emulated target, via a direct path from the radar transmitter. The direct path corresponds to a line-of-sight distance between the radar and the emulated target.

In block S1103, the radar signal is received at additional RTS (e.g., three or more RTSs) of the multiple RTSs, which are configured to respectively emulate ghost targets corresponding to the emulated target, via the direct path or an indirect path that includes the at least one emulated surface. The at least one emulated surface emulates reflection of the radar signal or corresponding echo signals between the radar and the emulated ghost targets. For example, an emulated surface may correspond to a point on the surface of a road. The indirect path therefore corresponds to a longer, reflected distance between the radar and the emulated target.

In block S1104, an emulated echo signal that emulates reflection of the radar signal from the emulated target is generated and transmitted from the RTS configured to emulate the emulated target. In this case, the radar signal is received and the emulated echo signal is transmitted along the direct path. The emulated echo signal has a first phase representative of propagation along the direct path in both directions.

In block S1105, emulated echo signals that emulate reflection of the radar signal from emulated ghost targets are generated and transmitted from the other RTSs configured to emulate the emulated ghost targets. In this case, the radar signal is received and/or the emulated echo signal are transmitted along the indirect path. The emulated echo signals have different phases representative of the various combinations of direct and indirect paths, where the different phases are different from one another and different from the first phase.

In block S1106, the radar receiver receives the emulated echo signals from the RTSs with the different phases. This enables testing of the radar's perception in the presence of interference effects to improve the accuracy of the detection of targets (e.g., the exact position) or to extract additional information (e.g., a height estimate).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied all or in part as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for emulating multipath effects of a radar signal transmitted by a radar under test and reflected from an emulated target and at least one emulated surface, the radar under test including a radar transmitter and a radar receiver, the system comprising:

a plurality of radar target simulators (RTSs) configured to generate and transmit a plurality of emulated echo signals having a plurality of different phases, respectively, in response to the radar signal transmitted by the radar under test, wherein at least one RTS of the plurality of RTSs is configured to emulate the emulated target, receiving the radar signal via a direct path from the radar transmitter, and wherein at least one other RTS of the plurality of RTSs is configured to emulate at least one ghost target corresponding to the emulated target, receiving the radar signal via the direct path or via an indirect path that includes the at least one emulated surface, the emulated surface reflecting the radar signal or at least one echo signal of the plurality of emulated echo signals; and a controller configured to control the plurality of RTSs to generate and transmit the plurality of emulated echo signals at the plurality of different phases, respectively, wherein the plurality of different phases correspond to the plurality of RTSs receiving the radar signal from the radar transmitter and the radar receiver receiving the plurality of emulated echo signals from the plurality of RTSs over different combinations of the direct path and the indirect path to replicate interference effects caused by multipath propagation when testing the radar under test.

2. The system of claim 1, wherein the at least one RTS of the plurality of RTSs comprises a first RTS configured to generate a first emulated echo signal of the plurality of emulated echo signals having a first phase of the plurality of different phases in response to the radar signal being received by the first RTS over the direct path and the first emulated echo signal being received by the radar receiver over the direct path, wherein the first emulated echo signal represents a location of the emulated target.

3. The system of claim 2, wherein the at least one other RTS of the plurality of RTSs comprises a second RTS configured to generate a second emulated echo signal of the plurality of emulated echo signals having a second phase of the plurality of different phases in response to the radar signal being received by second RTS over the indirect path and the second emulated echo signal being received by the radar receiver over the direct path, wherein the second emulated echo signal represents a location of a first emulated ghost target.

4. The system of claim 2, wherein the at least one other RTS of the plurality of RTSs comprises a third RTS configured to generate a third emulated echo signal of the plurality of emulated echo signals having a third phase of the plurality of different phases in response to the radar signal being received by third RTS over the direct path and the third emulated echo signal being received by the radar receiver over the indirect path, wherein the third emulated echo signal represents a location of a second emulated ghost target.

5. The system of claim 4, wherein the at least one other RTS of the plurality of RTSs comprises a fourth RTS configured to generate a fourth emulated echo signal of the plurality of emulated echo signals having a fourth phase of the plurality of different phases in response to the radar signal being received by fourth RTS over the indirect path and the fourth emulated echo signal being received by the radar receiver over the indirect path, wherein the fourth emulated echo signal represents a location of a third emulated ghost target.

6. The system of claim 1, wherein the plurality of RTSs are grouped in one instance in a single location.

7. The system of claim 3, wherein the first and second RTSs are grouped in a first instance in a first location at a first angle corresponding to the direct path.

8. The system of claim 5, wherein the third and fourth RTSs are grouped in a second instance in a second location at a second angle corresponding to the indirect path.

9. The system of claim 1, wherein the plurality of RTSs are positioned at a plurality of different locations, wherein at least one location of the plurality of different locations is at an angle from the radar receiver that corresponds to a true direction of at least one emulated echo signal of the plurality of emulated echo signals.

10. The system of claim 9, wherein another location of the plurality of different locations is at an angle from the radar receiver that corresponds to a position of the at least one emulated surface.

11. The system of claim 1, wherein the controller is further configured to determine the plurality of different phases of the plurality of emulated echo signals based on effective distances between the radar and each of the emulated target and the at least one emulated ghost target, wherein the effective distances are distances at which the radar perceives the emulated target and the at least one emulated ghost target.

12. The system of claim 11, wherein the controller is further configured to determine the plurality of different phases of the plurality of emulated echo signals by calculating twice an effective distance modulo a wavelength of the radar signal for each of the emulated target and the at least one emulated ghost target.

13. A method for emulating multipath effects of a radar signal transmitted by a radar under test and reflected from an emulated target and at least one emulated surface, the radar under test including a radar transmitter and a radar receiver, the method comprising:

provide a plurality of radar target simulators (RTSs) for generating and transmitting emulated echo signals having different phases, respectively, in response to the radar signal received from the radar under test;

receiving the radar signal at a first RTS of the plurality of RTSs via a direct path from the radar transmitter, wherein the first RTS is configured to emulate the emulated targets;

receiving the radar signal at at least one second RTS of the plurality of RTSs via the direct path or an indirect path, which includes the at least one emulated surface that emulates reflection of the radar signal or corresponding echo signals, wherein the at least one second RTS is configured to emulate at least one ghost target corresponding to the emulated target;

generating and transmitting a first emulated echo signal having a first phase from the first RTS, wherein the first emulated echo signal emulates reflection of the radar signal from the emulated target, and wherein the first phase is representative of propagation of both the radar signal and the first emulated echo signal along the direct path; and generating and transmitting at least one second emulated echo signal having at least one second phase from the at least one second RTS, wherein the at least one second emulated echo signal emulates reflection of the radar signal from the at least one ghost target, and wherein the at least one second phase is representative of propagation of one or both the radar signal and the at least one second emulated echo signal along the indirect path, wherein the radar receiver receives the first emulated echo signal having the first phase and the at least one second emulated echo signal having the at least one second phase, enabling testing of an ability of the radar to distinguish between the first emulated echo signal and the at least one second emulated echo signal to identify a location of the emulated target based on the first phase and the at least one second phase.

14. The method of claim 13, wherein providing the plurality of RTSs comprises grouping the plurality of RTSs in one instance in a single location.

15. The method of claim 14, wherein providing the plurality of RTSs comprises grouping the first RTS and the at least one second RTS in a first instance in a first location at a first angle corresponding to the direct path.

16. The method of claim 15, wherein providing the plurality of RTSs comprises grouping another second RTS in a second instance in a second location at a second angle corresponding to the indirect path.

17. The method of claim 13, wherein the plurality of RTSs are positioned at a plurality of different locations, wherein at least one location of the plurality of different locations is at an angle from the radar receiver that corresponds to a true direction of at least one emulated echo signal of the emulated echo signals, and wherein another location of the plurality of different locations is at an angle from the radar receiver that corresponds to a position of the at least one emulated surface.

18. The method of claim 13, wherein generating and transmitting the first emulated echo signal having the first phase comprises determining the first phase by calculating twice an effective distance modulo a wavelength of the radar signal, wherein the effective distance is a distance at which the radar perceives the emulated target.

19. The method of claim 18, wherein generating and transmitting the at least one second emulated echo signal having the second phase comprises determining the at least one second phase by calculating twice an effective distance modulo a wavelength of the radar signal, wherein the effective distance is a distance at which the radar perceives the at least one emulated ghost target.

20. A system for emulating multipath effects of a radar signal transmitted by a radar under test and reflected from a plurality of emulated targets and a plurality of emulated surfaces, the radar under test including a radar transmitter and a radar receiver, the system comprising:

a plurality of radar target simulators (RTSs) configured to generate and transmit a plurality of emulated echo signals having a plurality of different phases, respectively, in response to the radar signal transmitted by the radar under test, wherein a plurality of first RTSs of the plurality of RTSs are configured to emulate the plurality of emulated targets, receiving the radar signal via corresponding direct paths from the radar transmitter, and wherein a plurality of second RTSs of the plurality of RTSs are configured to emulate a plurality of ghost targets corresponding to the plurality of emulated targets, receiving the radar signal via the direct paths or via indirect paths that include the plurality of emulated surfaces, the emulated surfaces reflecting the radar signal or one or more emulated echo signals of the plurality of emulated echo signals; and a controller configured to control the plurality of RTSs to generate and transmit the plurality of emulated echo signals at the plurality of different phases, respectively, wherein the plurality of different phases correspond to the plurality of RTSs receiving the radar signal from the radar transmitter and the radar receiver receiving the plurality of emulated echo signals from the plurality of RTSs over different combinations of the direct paths and the indirect paths to replicate interference effects caused by multipath propagation when testing the radar under test.

* * * * *